United States Patent Office 3,136,804
Patented June 9, 1964

3,136,804
OXIDATION PROCESS FOR CONVERTING UNSATURATED TERTIARY PHOSPHITE ESTERS TO PHOSPHATES
James J. Hodan, Tonawanda, and Charles F. Baranauckas, Niagara Falls, N.Y., assignors to Hooker Chemical Corporation, Niagara Falls, N.Y., a corporation of New York
No Drawing. Filed Aug. 4, 1960, Ser. No. 47,359
12 Claims. (Cl. 260—461)

This invention relates to the preparation of trialkenyl phosphates and tris(halo substituted alkenyl) phosphates. More particularly this invention refers to the oxidation of trialkenyl phosphites and tris(halo substituted alkenyl) phosphites with air or oxygen to yield the corresponding phosphates.

Trialkenyl phosphates such as triallyl phosphate are valuable intermediates in the flameproofing field. Heretofore, these phosphates were prepared by oxidizing the corresponding phosphite with an oxygen-containing substance in so called "wet" techniques. For example, the phosphite was reacted with hydrogen peroxide under alkaline conditions in an aqueous medium. Techniques such as this cause hydrolysis of the phosphite and as a result the yield of trialkenyl phosphate was reduced substantially. In addition, close control of the pH of the reaction was necessary in order to inhibit the formation of undesired by-products.

It is an object of this invention to provide an improved method of preparing trialkenyl and tris(halo substituted alkenyl) phosphates.

A further object of the invention is to provide a method for preparing trialkenyl phosphates and tris(halo substituted alkenyl) phosphates of high yield and purity from the corresponding phosphites.

Still a further object of the invention is to provide an improved method of preparing triallyl phosphate from triallyl phosphite.

It is another object of the invention to provide novel catalysts for use in the preparation of trialkenyl and tris(halo substituted alkenyl) phosphates from the corresponding phosphites.

These and other objects of the invention will be apparent from the following detailed description.

It has now been discovered that trialkenyl phosphates and tris(halo substituted alkenyl) phosphates can be obtained in excellent yields by oxidizing the corresponding trialkenyl phosphite or tris(halo substituted alkenyl) phosphite with an oxygen-containing gas selected from the group consisting of air, oxygen, and mixtures thereof, preferably in the presence of a catalytic amount of a metal oxide catalyst. It is indeed surprising that this reaction can be carried out successfully in view of the tendency of alkenyl compounds such as triallyl phosphite and triallyl phosphate to polymerize.

Typical examples of trialkenyl phosphites and tris(halo substituted akenyl) phosphites which are suitable as starting materials include triallyl phosphite, trimethallyl phosphite, tris(2-chloroallyl) phosphite, tris(2-bromoallyl) phosphite, tris(2-fluoroallyl) phosphite, tricrotyl phosphite, tris(3-chloroallyl) phosphite, tris(3-chloromethylallyl) phosphite and mixtures thereof. The products obtained are trialkenyl and tris(halo substituted phosphates such as triallyl phosphate, trimethallyl phosphate, tris(2-chloroallyl) phosphate, tris(2-bromoallyl) phosphate, tris(2-fluoroallyl) phosphate, tricrotyl phosphate, tris(3-chloroallyl) phosphate, tris(3-chloromethylallyl) phosphate and mixtures thereof.

It is also possible to use mixed alkenyl phosphites such as diallyl monomethallyl phosphite, for example, to form the corresponding diallyl monomethallyl phosphate.

In general the phosphite esters which are oxidized to the corresponding phosphate should have at least one ethylenically unsaturated double bond. Thus, in addition to the aforesaid phosphites there can also be used monoaryl dialkenyl phosphite, monoaryl bis(halo substituted-alkenyl) phosphites, diaryl monoalkenyl phosphites, diaryl mono(halo-substituted alkenyl) phosphites, monoalkyl dialkenyl phosphites, monoalkyl bis(halo substituted alkenyl) phosphites, dialkyl monoalkenyl phosphites, and dialkyl mono(halo substituted alkenyl) phosphites.

The reaction is carried out by contacting an oxygen-containing gas such as oxygen, air and mixtures thereof with the phosphite in sufficient proportions to convert substantially of the phosphite to the corresponding phosphate. Completion of the reaction can be determined by any suitable means, for example, by measuring the refractive index of a portion of the reaction mixture, or by contacting a sample of the reaction mixture with iodine whereby any phosphite present in the reaction mixture will reduce the iodine and form a colorless solution. The rate of addition of the oxygen-containing gas will vary with the oxygen content of the gas. For example, in treating triallyl phosphite with air, substantially complete conversion of the phosphite to the corresponding phosphate can be obtained when air is bubbled through the triallyl phosphite at the rate of between about ninety milliliters and four hundred and fifty milliliters of air per minute per mole of triallyl phosphite. When oxygen is employed as the oxygen-containing gas the rate of addition can be reduced substantially. Any rate of addition of oxygen-containing gas that is consistent with economic operation may be employed. The oxygen-containing gas may be reacted with the trialkenyl phosphite or tris(halo substituted alkenyl) phosphite by bubbling the gas through the phosphite by means of a sparging system or any other suitable liquid-gas contact technique.

The temperature of the reaction is preferably maintained between about sixty degrees centigrade and about one hundred and thirty degrees centigrade. When temperatures above about one hundred and thirty degrees centigrade are obtained in the reaction mixture, polymerization of the phosphite and/or phosphate may be effected, and therefore temperatures above about one hundred and thirty degrees centigrade are not as desirable as those between sixty and one hundred and thirty degrees centigrade. Temperatures below about sixty degrees centigrade may be employed, but at these temperatures the reaction rate is reduced significantly.

Since the reaction mixture is substantially free of water, the danger of hydrolysis of the phosphite is completely removed.

The time of reaction will depend upon the rate of addition of the oxygen-containing gas and of the type of phosphite being oxidized. Generally complete conversion of the phosphite to the phosphate can be obtained in as little as seven hours. However, the reaction time can be markedly decreased by adding a catalytic amount of a metal oxide catalyst to the phosphite prior to or simultaneously with the addition of the oxygen-containing gas. Suitable metal oxide catalysts include aluminum oxide, vanadium pentoxide and mixtures thereof. Sufficient metal oxide is added to the phosphite to provide at least about 0.25 percent, and preferably between about two and about ten percent by weight of the phosphite. However, greater or lesser amounts of metal oxide catalyst may be added if desired. After completion of the reaction the solid catalyst is separated from the liquid phosphate by filtration or other solid-liquid separation technique.

Because of the high purity of the phosphates produced in accordance with the instant novel process, the products are suitable for use in the preparation of polymers, telomers and copolymers.

The following examples are presented to define the invention more fully without any intent of being limited thereby. All parts and percentages are by weight unless otherwise specified.

*Example 1*

The apparatus employed in this example was a two hundred and fifty milliliter, three-neck flask provided with a condenser, a thermometer, a heating mantel and a stirrer. Air was pumped through a line equipped with a rotameter which communicated with a gas dispenser positioned in the bottom of the flask. Two hundred and two grams of triallyl phosphite (one mole) were added to the flask, and air was fed through the gas dispenser, while agitating the triallyl phosphite, at a rate of three hundred milliliters per minute. The triallyl phosphite was maintained at a temperature of about one hundred degrees centigrade for seven hours. After this period a portion of the residue was analyzed by infrared analysis and was found to contain ninety-five percent triallyl phosphate. The refractive index of a sample of the residue at twenty-four degrees centigrade was 1.4495. The total residue weighed two hundred and ten grams which was equivalent to 96.4 percent trialkenyl phosphate.

A portion of triallyl phosphate from the residue, when admixed with a one percent benzoyl peroxide solution was easily polymerized to yield a hard clear solid.

*Example 2*

Employing the apparatus of Example 1, fifty milliliters of trimethallyl phosphite was added to the flask and air was bubbled through the phosphite at the rate of three hundred milliliters per minute for about six hours. The temperature of the reaction mixture was maintained at about one hundred degrees centigrade during this period. The residue by infrared analysis contained eighty-eight percent trimethallyl phosphate and had a refractive index at a temperature of one hundred and twenty degrees centigrade of 1.4560.

*Example 3*

Employing the apparatus of Example 1, fifty grams of triallyl phosphite and two grams of aluminum oxide were added to the flask. While agitating the phosphite and aluminum oxide, air was bubbled through the mixture at a rate of four hundred and fifty milliliters per minute, while maintaining a temperature of about one hundred and twenty-five degrees centigrade in the flask. After three hours of reaction, the residue was filtered to remove the catalyst and the filtrate was found by infrared analysis to be greater than ninety-five percent triallyl phosphate. The refractive index at twenty-two degrees centigrade of the product was 1.4495.

*Example 4*

The procedure of Example 3 was repeated with the exception that oxygen instead of air was added to the triallyl phosphite at a rate of ninety milliliters per minute. The temperature during reaction was maintained at one hundred and ten degrees centigrade. After two hours of reaction the residue was filtered to remove the catalyst, and the filtrate was found, by infrared analysis, to contain greater than about ninety-five percent triallyl phosphate. The refractive index of the triallyl phosphate at twenty-two degrees centigrade was 1.4495.

It will be recognized by those skilled in the art that various modifications within the invention are possible, some of which have been referred to above. Therefore, we do not wish to be limited except as defined by the appended claims.

We claim:
1. A process for preparing a triester of phosphoric acid having one to three ethylenically unsaturated double bonds, not more than one such double bond being present in each esterifying group, which comprises oxidizing a triester of phosphorous acid having one to three ethylenically unsaturated double bonds not more than one such double bond being present in each esterifying group, with an oxygen-containing gas selected from the group consisting of air, oxygen and mixtures thereof, in the presence of a catalytic amount of aluminum oxide.

2. A process for preparing a trialkenyl phosphate which comprises oxidizing a trialkenyl phosphite with an oxygen-containing gas selected from the group consisting of air, oxygen, and mixtures thereof, in the presence of a catalytic amount of aluminum oxide.

3. A process for preparing triallyl phosphate which comprises oxidizing a triallyl phosphite with an oxygen-containing gas selected from the group consisting of air, oxygen, and mixtures thereof, in the presence of a catalytic amount of aluminum oxide.

4. A process for preparing trimethallyl phosphate which comprises oxidizing trimethallyl phosphite with an oxygen-containing gas selected from the group consisting of air, oxygen, and mixtures thereof, in the presence of a catalytic amount of aluminum oxide.

5. The process for preparing a trialkenyl phosphate selected from the group consisting of triallyl phosphate, trimethallyl phosphate, tris(2-chloroallyl) phosphate, tris(2-bromoallyl) phosphate, tris(2-fluoroallyl) phosphate, tricrotyl phosphate, tris(3-chloroallyl) phosphate, tris(3-chloromethylallyl) phosphate, and mixtures thereof, which comprises oxidizing a phosphate selected from the group consisting of triallyl phosphite, trimethallyl phosphite, tris(2-chloroallyl) phosphite, tris(2-bromoallyl) phosphite, tris(2-fluoroallyl) phosphite, tricrotyl phosphite, tris(3-chloroallyl) phosphite, tris(3-chloromethylallyl) phosphite, and mixtures thereof, with an oxygen-containing gas selected from the group consisting of air, oxygen, and mixtures thereof in the presence of a catalytic amount of aluminum oxide.

6. The process of claim 5 wherein said oxygen-containing gas is air.

7. The process of claim 5 wherein said oxygen-containing gas is oxygen.

8. The process of claim 5 wherein the proportion of said aluminum oxide catalyst is between about two and about ten percent by weight of triallyl phosphite.

9. A process for preparing trimethallyl phosphate which comprises oxidizing trimethallyl phosphite with an oxygen-containing gas selected from the group consisting of air, oxygen and mixtures thereof, in the presence of aluminum oxide.

10. The process of claim 9 wherein said oxygen-containing gas is air.

11. The process of claim 9 wherein said oxygen-containing gas is oxygen.

12. The process of claim 9 wherein the proportion of said aluminum oxide catalyst is between about two and about ten percent by weight of trimethallyl phosphite.

References Cited in the file of this patent

UNITED STATES PATENTS

| | | |
|---|---|---|
| 2,318,959 | Muskat | May 11, 1943 |
| 2,589,326 | Oberright | Mar. 18, 1952 |
| 2,851,476 | Hechenbleikner | Sept. 9, 1958 |

OTHER REFERENCES

Fox et al.: "The Chemistry of Organo-Phosphorus Compounds," 1948, p. 62.

Kosolapoff: Organo Phosphorus Compounds, p. 196, 1950 edition, John Wiley & Sons, New York, N.Y.

Kuznetsov et al.: Zhurmal Obschey Khimii, 1959, vol. 29, No. 6, pp. 2017–2018.